Sept. 6, 1932.  H. E. DIETRICH  1,876,279
MANDREL
Filed Aug. 23, 1930
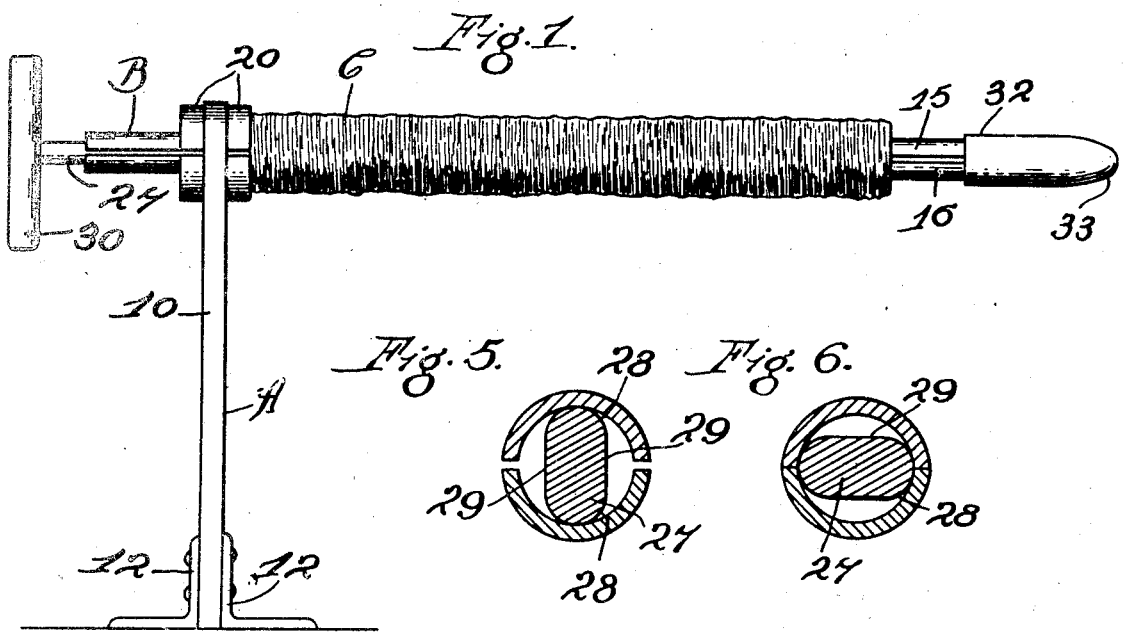

Patented Sept. 6, 1932

1,876,279

UNITED STATES PATENT OFFICE

HAROLD E. DIETRICH, OF CHICAGO, ILLINOIS, ASSIGNOR TO THE VISKING CORPORATION, OF CHICAGO, ILLINOIS, A CORPORATION OF VIRGINIA

MANDREL

Application filed August 23, 1930. Serial No. 477,357.

This invention relates to mandrels which are employed in the shirring of sausage casings, or the like, and it is particularly adapted to be used in practicing the method of preparing sausage casings or stuffings which is disclosed in United States Letters Patent No. 1,616,971, granted to William F. Henderson, February 8, 1927.

Either cellulose or animal casings may be shirred upon the improved mandrel, but it is particularly adapted for use in connection with cellulose casings.

One method of producing cellulose casings comprises the steps of extruding viscose; coagulating the extruded viscose; purifying the casing; introducing into the walls of the casing a small percentage of some hygroscopic agent, such as glycerine, and drying the casings.

After the casing has been dried, it is preferably shirred upon a collapsible mandrel from which it is transferred to a storage mandrel.

The casings loaded on storage mandrels may be shipped to sausage factories and preserved indefinitely. When the casing is to be stuffed the storage mandrel is brought into alinement with the stuffer-horn of the stuffing machine and the casing is transferred, as a unit, to the stuffing horn by sliding it thereon.

The present invention relates particularly to the collapsible mandrel upon which the dried casing is shirred before it is transferred to the storage mandrel, and particular objects of the invention are to provide a shirring member which will facilitate the task of shirring the sausage casings; which will insure a shirred casing suitable for transfer from the storage mandrel onto the stuffer horn, and which is of simplified construction.

Many other objects and advantages of the invention will become apparent as the following description progresses, reference being had to the accompanying drawing, wherein:

Figure 1 is a side elevation of the improved mandrel, a shirred sausage casing being shown thereon; Fig. 2 is a central longitudinal section through the improved mandrel, some of the parts being shown in elevation; Fig. 3 is an enlarged section taken on line 3—3 of Fig. 2, a cam member or pin forming part of the device being shown rotated through an angle of 180° from the position wherein it is shown in Fig. 2; Fig. 4 is an end elevation of the improved mandrel; Figs. 5 and 6 are enlarged sections taken substantially on line 3—3 of Fig. 2 and illustrating changed positions of parts constituting the mandrel, and Fig. 7 is a longitudinal section through the shirring end of the mandrel, a storage mandrel being shown in connection therewith to illustrate the manner in which the shirred sausage casing is transferred to the storage mandrel.

In the illustration given, A designates a standard which may be secured to any suitable support (not shown); B, a collapsible mandrel carried by the standard A; C, a sausage casing in shirred condition; and D, a storage mandrel.

The standard A preferably comprises a vertically disposed bar 10 having an aperture 11 in its upper end and provided with brackets 12 at its lower end, which brackets may be employed to secure the standard to its support (not shown).

The collapsible mandrel B preferably comprises a pair of approximately semi-circular sections 15 and 16. The two sections project through the aperture 11. The lower section 16 is supported directly by the bar 10 and two approximately semi-circular members 18 which are riveted to the bar and also welded thereto, as indicated at 19. The upper section 15 has two approximately semi-circular pieces 20 secured thereto by screws 21, or the equivalent, the pieces 20 being disposed one on either side of the bar 10 to prevent longitudinal displacement of the section 15.

The right-hand ends (Fig. 2) of the sections 15 and 16 are connected to each other by a pin 23 which slidably engages the section 15 to permit relative movement between the sections. The pin 23 projects through approximately semi-circular blocks 24 and 25 which are welded to the inner surface of the sections 15 and 16, respectively, and limit movement of the sections toward each other.

Disposed between the sections 15 and 16 is a cam member or pin 27 having a cross-section which is illustrated in Figs. 3, 5 and 6. It will be noted that the pin 27 is somewhat flattened and that it has rounded oppositely disposed edges 28, the flattened portions being identified by the reference character 29. The pin 27 is rotatable, and when it is brought into the position shown in Fig. 5, the sections 15 and 16 are spaced from each other as illustrated in that figure. If the pin is rotated through an angle of 180° from the position wherein it is shown in Fig. 5, it will assume the position wherein it is shown in Fig. 6 and will permit the sections to approach and contact with each other. A handle 30 secured to one end of the pin 27 may be employed to rotate it manually.

The right-hand end (Figs. 1 and 2) of the mandrel B is preferably equipped with a detachable thimble 32 having a tapered forward end 33 which facilitates the task of pulling the sausage casing onto the mandrel and prevents injury to the sausage casing by the split end of the mandrel.

In the operation of the above described apparatus, the thimble 32 is first slipped over the right-hand end (Fig. 2) of the mandrel and the cam member or pin 27 then turned to the position wherein it is shown in Figs. 2 and 5 so that the mandrel is expanded to its maximum diameter. One end of the sausage casing is then pulled over the thimble 32 and drawn backward toward the bar 10. The casing is then shirred or folded onto the mandrel, whereupon the mandrel is collapsed by rotating the cam member or pin 27 into the position wherein it is illustrated in Figs. 3 and 6 so that the section 15 may drop down upon the section 16 and thus reduce the mandrel to its minimum diameter. The thimble 32 is then removed and the casing is transferred, as a unit, onto the storage mandrel D.

As shown in Fig. 7, the storage mandrel D has a projecting portion 40 of reduced diameter which is adapted to enter the right-hand end (Fig. 2) of the mandrel B to aline the storage mandrel with the collapsible mandrel. In Fig. 7, I have shown the casing C transferred from the mandrel B to the storage mandrel D.

In one embodiment of the invention, the sections 15 and 16 are formed from a tube which has an outside diameter of eleven-sixteenths of an inch. The tube is cut longitudinally by removing two strips therefrom spaced 180° apart, each strip being three-thirty-seconds of an inch in width. The cross-section of the cam member or pin 27 measures three-eighths of an inch through its major axis and one-quarter of an inch through its minor axis. When the cam member or pin 27 is turned so that its major axis is disposed, as illustrated in Fig. 5, the mandrel has its full diameter of eleven-sixteenths of an inch, but when the cam member is rotated into the position wherein it is shown in Fig. 6, the cross-section of the mandrel is approximately an ellipse having a diameter of five-eighths of an inch through its major axis and a diameter of nineteen-thirty-seconds of an inch through its minor axis. When the mandrel collapses, its cross-sectional area is such that the shirred tube slips readily from the mandrel.

A feature of the above described construction is that the cam member or pin 27 extends nearly the entire length of the mandrel and, therefore, holds the upper section 15 substantially parallel with the lower section 16 when the mandrel is in an expanded position.

The foregoing detailed description has been given for clearness of understanding only and no unnecessary limitations should be understood therefrom, but the appended claim should be construed as broadly as permissible, in view of the prior art.

What I regard as new, and desire to secure by Letters Patent, is:

In a device for shirring sausage casings, a standard having an aperture therein, and a collapsible mandrel having one end mounted in said standard, said mandrel comprising members extending longitudinally thereof and adapted to receive said sausage casings, said members projecting through said aperture and one of said members being movable transversely in said aperture when said mandrel is collapsed or expanded, a cam extending between said members substantially the entire length thereof and rotatable to displace said transversely movable member in a direction away from the other of said members whereby the diameter of the mandrel is increased, and means at the other end of said mandrel and extending between said members for holding them in alinement with each other.

In testimony whereof, I have hereunto set my signature, this 8th day of August, 1930.

HAROLD E. DIETRICH.